United States Patent
Gotanda et al.

(10) Patent No.: US 10,977,638 B2
(45) Date of Patent: *Apr. 13, 2021

(54) SETTLEMENT APPARATUS, CONTROL PROGRAM THEREFOR, AND CHECKOUT SYSTEM

(71) Applicant: TOSHIBA TEC KABUSHIKI KAISHA, Tokyo (JP)

(72) Inventors: Tsuyoshi Gotanda, Tokyo (JP); Akiko Susaki, Tokyo (JP); Norifumi Shishido, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/775,302

(22) Filed: Jan. 29, 2020

(65) Prior Publication Data

US 2020/0167754 A1 May 28, 2020

Related U.S. Application Data

(62) Division of application No. 15/285,566, filed on Oct. 5, 2016, now Pat. No. 10,607,205.

(51) Int. Cl.
*G06Q 20/20* (2012.01)
*G07G 1/00* (2006.01)
(Continued)

(52) U.S. Cl.
CPC ......... *G06Q 20/209* (2013.01); *G06Q 20/204* (2013.01); *G07G 1/0072* (2013.01); *G07G 1/12* (2013.01); *H04N 1/00323* (2013.01)

(58) Field of Classification Search
CPC .. G06Q 20/209; G06Q 20/204; G07G 1/0072; G07G 1/12; H04N 1/00323
(Continued)

(56) References Cited

U.S. PATENT DOCUMENTS

| 2011/0225055 A1* | 9/2011 | Takahashi | G07G 1/0045 705/16 |
| 2011/0225056 A1* | 9/2011 | Akiyama | G07G 1/01 705/16 |
| 2017/0221294 A1* | 8/2017 | Niizuma | G07D 1/06 |

FOREIGN PATENT DOCUMENTS

| JP | 60-254290 | 12/1985 |
| JP | 7-152952 | 6/1995 |

(Continued)

OTHER PUBLICATIONS

Japanese Office Action for Japanese Patent Application No. 2019-194677 dated Jun. 23, 2020.

(Continued)

*Primary Examiner* — Garcia Ade
(74) *Attorney, Agent, or Firm* — Amin, Turocy & Watson, LLP

(57) ABSTRACT

A settlement apparatus in an embodiment includes a settling section, a discharging section, an article detecting section, and a processing section. The settling section performs settlement processing for settlement concerning a commercial transaction. The discharging section discharges a prescribed article to a receiving section after the end of the settlement processing by the settling section. The article detecting section detects remaining of the article in the receiving section. The processing section performs, if the article detecting section detects the remaining of the article at a point in time when a prescribed time elapses after the article is discharged by the discharging section, predetermined processing for making it possible to check the remaining of the article afterwards.

9 Claims, 8 Drawing Sheets

(51) Int. Cl.
*G07G 1/12* (2006.01)
*H04N 1/00* (2006.01)

(58) Field of Classification Search
USPC .......................................................... 705/17
See application file for complete search history.

(56) References Cited

FOREIGN PATENT DOCUMENTS

| | | |
|---|---|---|
| JP | 09-7042 | 1/1997 |
| JP | 2004-094545 | 3/2004 |
| JP | 2010-237910 | 10/2010 |
| JP | 2011-170788 | 9/2011 |
| JP | 4981423 | 7/2012 |

OTHER PUBLICATIONS

Chinese Office Action for Chinese Patent Application No. 201610881734.4 dated Jun. 3, 2019.
Japanese Office Action for Japanese Patent Application No. 2015-201045 dated Jun. 25, 2019.
Non-Final Office Action for U.S. Appl. No. 15/285,566 dated Jun. 13, 2019.
Japanese Office Action for Japanese Patent Application No. 2019-194677 dated Sep. 15, 2020.

\* cited by examiner

FIG. 5

```
         ○○○ SUPERMARKET                    ─40

UNTAKEN ARTICLE SLIP

CONCERNING TRANSACTION DESCRIBED BELOW,    ⎫
      COINS OF CHANGE ARE LEFT UNTAKEN          ⎬ 41
                                                 ⎭

------------------------------------------
           NOVEMBER 11, 2011 (FRI) 11:11        ⎫
     TRANSACTION NUMBER 00067   REGISTER #0003   ⎪
                                                 ⎪
       CABBAGE                   ¥88            ⎬ 42
       JUMBO FRANKFURTER         ¥150            ⎪
       CURRY BUN                 ¥110            ⎭
     ------------------------------------------
       TOTAL                     ¥348           ⎫
       (CONSUMPTION TAX INCLUDED  ¥16)          ⎪
       DEPOSIT                  ¥5,000           ⎬ 43
       CHANGE                   ¥4,652           ⎪
                        (BILLS:¥4,000)           ⎪
                        (COINS:  ¥652)           ⎭
```

SETTLEMENT APPARATUS, CONTROL PROGRAM THEREFOR, AND CHECKOUT SYSTEM

CROSS-REFERENCE TO RELATED APPLICATIONS

This application is a Divisional of application Ser. No. 15/285,566 filed on Oct. 5, 2016, the entire contents of which are incorporated herein by reference.

This application is based upon and claims the benefit of priority from Japanese Patent Application No. 2015-201045, filed Oct. 9, 2015, the entire contents of which are incorporated herein by reference.

FIELD

Embodiments described herein relate generally to a settlement apparatus, a control program therefor, and a checkout system.

BACKGROUND

A settlement apparatus for a settler to act as an operator and perform settlement sometimes discharges an article such as change or a credit card after the end of the settlement. The article discharged in this way should be removed by the operator.

However, the operator sometimes forgets to take the discharged article. In this case, a store clerk needs to collect and store the article left untaken. Therefore, labor for management of the article occurs.

Under such circumstances, it has been desired that the labor for management of the untaken article can be reduced.

JP-A-2004-237910 and JP-A-2010-237910 are examples of the related art.

DESCRIPTION OF THE DRAWINGS

FIG. 5 is a diagram showing an example of an untaken article slip;

DETAILED DESCRIPTION

In general, according to one embodiment, a settlement apparatus includes a settling section, a discharging section, an article detecting section, and a recording section. The settling section performs settlement processing for settlement concerning a commercial transaction. The discharging section discharges a prescribed article to a receiving section concerning the settlement processing by the settling section. The article detecting section detects remaining of the article in the receiving section. The recording section records, if the article detecting section detects the remaining of the article at a point in time when a prescribed time elapses after the article is discharged by the discharging section, information indicating the article in association with identification information for identifying the commercial transaction.

First Embodiment

A first embodiment is explained with reference to the drawings. Note that, in the first embodiment, a self-checkout apparatus including functions of a settlement apparatus is explained as an example.

Figure 1:
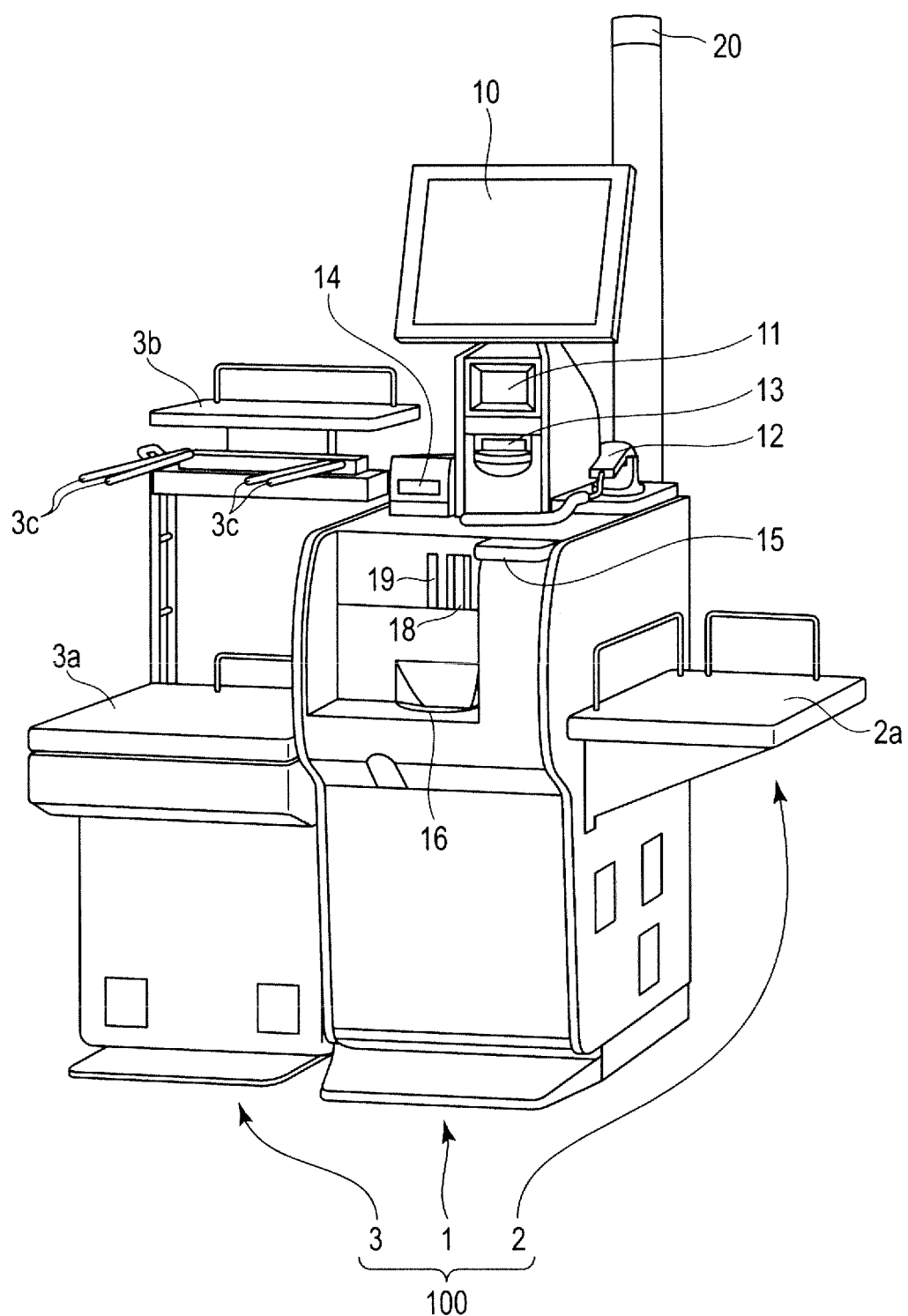
FIG. 1 is a perspective view of the exterior of a self-checkout apparatus according to a first embodiment.
Figure 2:
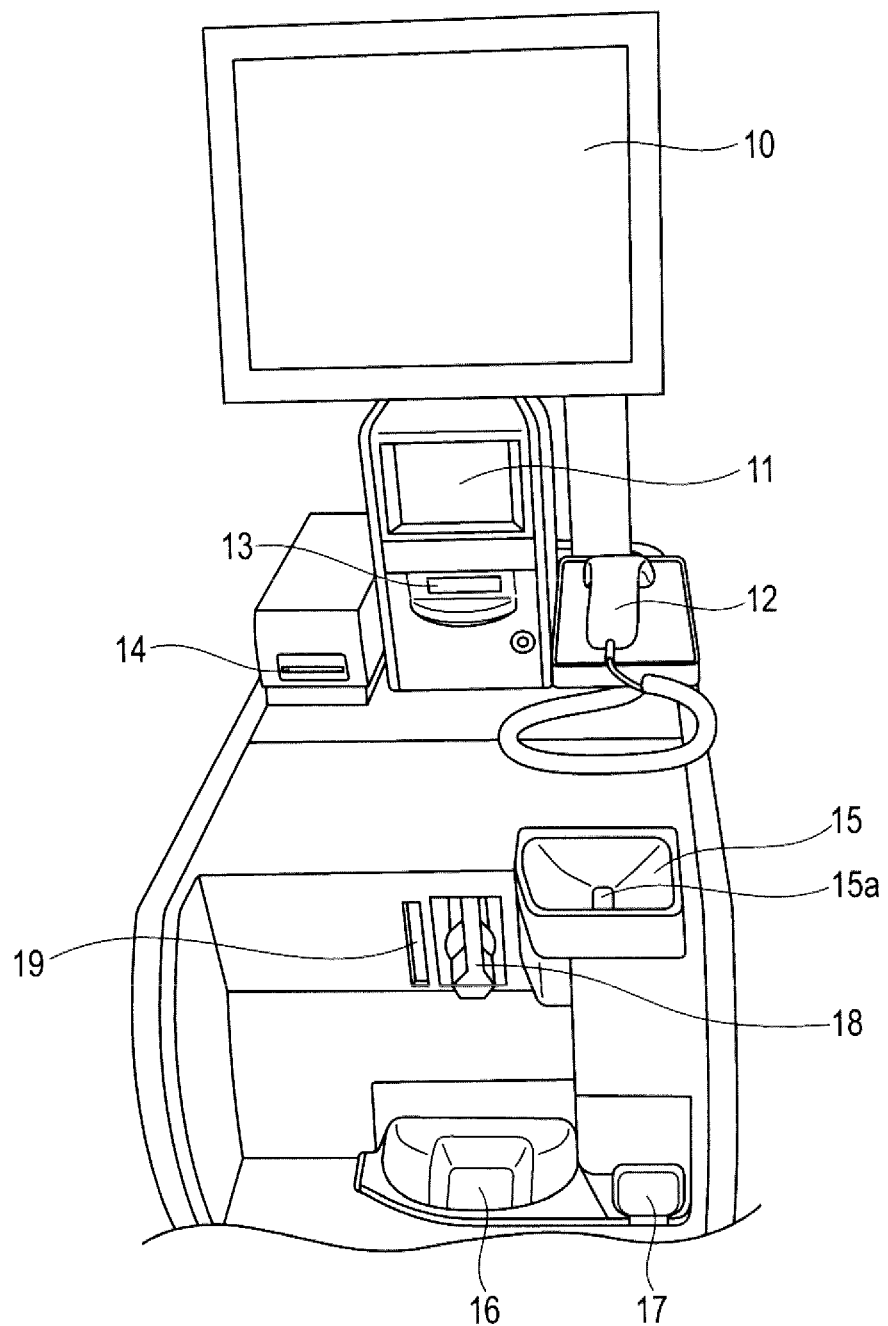
FIG. 2 is a perspective view showing a part of the self-checkout apparatus shown in FIG. 1.

FIG. 1 is a perspective view of the exterior of a self-checkout apparatus 100 according to the first embodiment. FIG. 2 is a perspective view showing a part of the self-checkout apparatus 100. Note that the self-checkout apparatus 100 in the first embodiment is also called a self-checkout type POS terminal or a self-register apparatus. The self-checkout apparatus 100 is operated by a shopper. Therefore, the shopper is an operator of the self-checkout apparatus 100.

The self-checkout apparatus 100 includes a main body 1 and measuring units 2 and 3.

The main body 1 includes a touch panel 10, a scanner window 11, a handy scanner 12, a receipt issue port 13, a card insertion port 14, a coin input tray 15, a change tray 16, a reject tray 17, a bill insertion port 18, a bill discharge port 19, and a patrol lamp 20.

The touch panel 10 displays various screens for informing the shopper of various kinds of information. Examples of the screens include (1) a guidance screen for informing the shopper of an operation method, (2) an information input screen for inputting information concerning commodities not affixed with barcodes, (3) a read-information display screen for displaying information based on barcode reading, and (4) an adjustment screen for displaying a total purchase amount, a deposit amount, a change amount, and the like in payment work for paying a purchase price. A part of the screens configures a GUI (graphical user interface). The touch panel 10 receives touch operation for operation of the GUI.

The scanner window 11 is formed by covering an opening formed in the main body 1 with transparent resin, glass or the like. The scanner window 11 makes it possible to scan, with a fixed scanner disposed on the inside of the main body 1, a commodity held in front of the scanner window 11 by the shopper. The fixed scanner is explained below.

The handy scanner 12 reads a barcode displayed on a commodity and outputs information represented by the barcode.

The receipt issue port 13 is a silt-like opening for discharging a receipt to the outside of the main body 1.

The card insertion port 14 is a slit-like opening for inserting a card into the inside of the main body 1 and discharging the card to the outside of the main body 1.

The coin input tray 15 receives coins input by the shopper for adjustment. An opening 15a is formed on the bottom surface of the coin input tray 15. The coins received by the coin input tray 15 are taken into the inside of the main body 1 from the opening 15a.

The change tray 16 receives coins discharged from the main body 1 as change. The coins discharged as the change are an example of an article discharged after the end of settlement processing. The change tray 16 is an example of a receiving section.

The reject tray 17 receives coins discharged from the main body 1 as unusable coins.

The bill insertion port 18 is a slit-like opening for taking, into the inside of the main body 1, bills inserted by the shopper for adjustment.

The bill discharge port 19 is a slit-like opening for discharging bills from the main body 1 as change. The bill discharge port 19 holds the bills in a state in which a part of the bills is projected to the outside of the main body 1. The bills discharged as the change are an example of an article discharged after the end of the settlement processing. The bill discharge port 19 is an example of the receiving section.

The patrol lamp 20 performs a flashing operation for warning.

The measuring unit 2 includes a table 2a for placing unregistered commodities. The measuring unit 2 measures total weight of the commodities placed on the table 2a.

The measuring unit 3 includes tables 3a and 3b for placing registered commodities and an arm 3c for hanging a bag in which the registered commodities are put. The measuring unit 3 measures total weight of the commodities placed on the tables 3a and 3b and the commodities put in the bag hung on the arm 3c.

Figure 3:
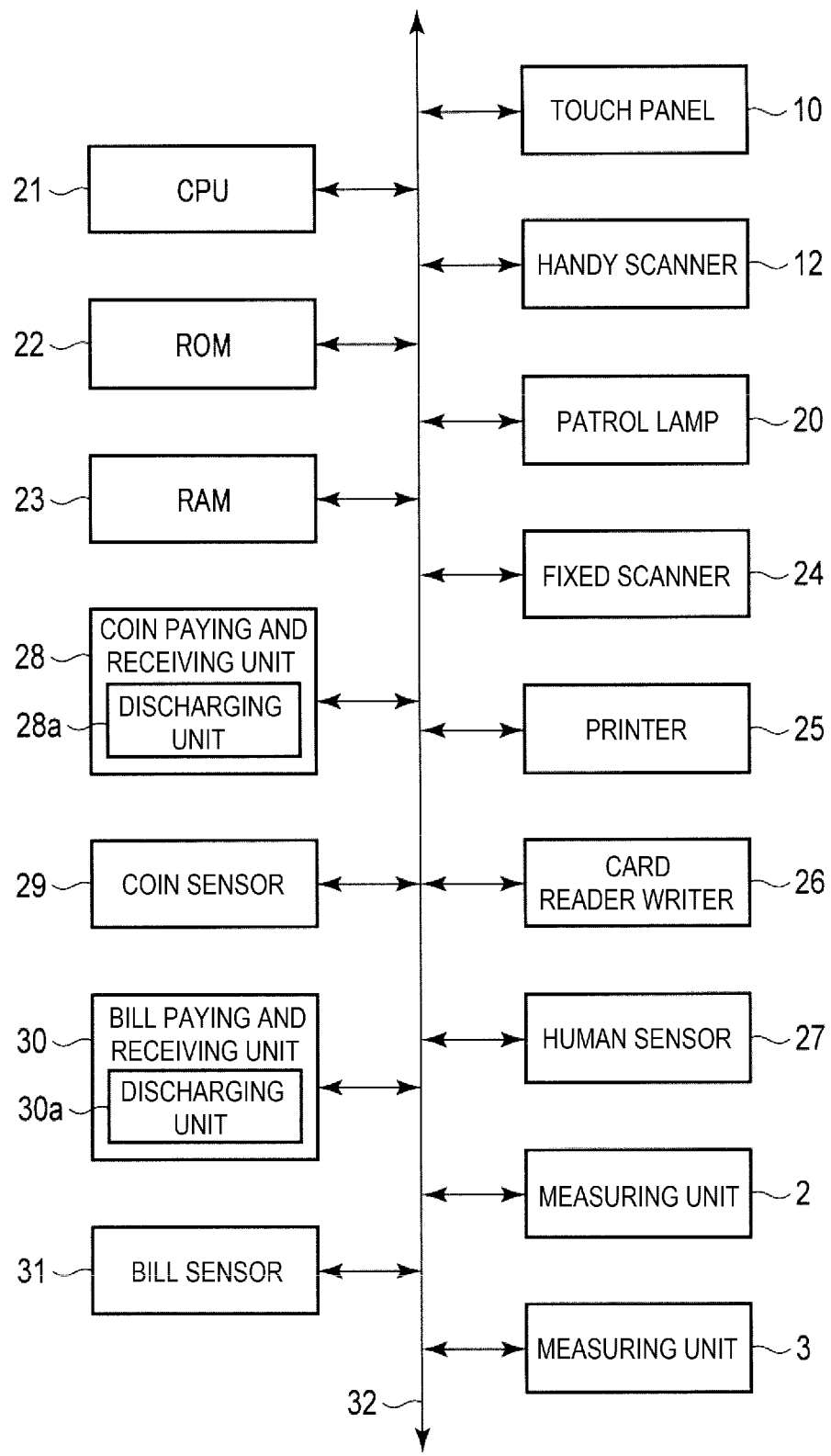
FIG. 3 is a block diagram showing a main part circuit configuration of the self-checkout apparatus shown in FIG. 1.

FIG. 3 is a block diagram showing a main part circuit configuration of the self-checkout apparatus 100. Note that parts same as the parts shown in FIGS. 1 and 2 are denoted by the same reference numerals and signs. Detailed explanation of the parts is omitted.

As shown in FIG. 3, the self-checkout apparatus 100 includes a CPU (central processing section) 21, a ROM (read-only memory) 22, a RAM (random-access memory) 23, a fixed scanner 24, a printer 25, a card reader writer 26, a human sensor 27, a coin paying and receiving unit 28, a coin sensor 29, a bill paying and receiving unit 30, and a bill sensor 31 besides the measuring units 2 and 3, the touch panel 10, the handy scanner 12, and the patrol lamp 20. The CPU 21, the ROM 22, the RAM 23, the fixed scanner 24, the printer 25, the card reader writer 26, the human sensor 27, the coin paying and receiving unit 28, the coin sensor 29, the bill paying and receiving unit 30, and the bill sensor 31 are housed in the main body 1. The measuring units 2 and 3, the touch panel 10, the handy scanner 12, the CPU 21, the ROM 22, the RAM 23, the fixed scanner 24, the printer 25, the card reader writer 26, the coin paying and receiving unit 28, the coin sensor 29, and the bill paying and receiving unit 30 are connected via a communication system 32 including a system bus.

The CPU 21, the ROM 22, and the RAM 23 configure a computer connected by the communication system 32 to control the self-checkout apparatus 100.

The CPU 21 is equivalent to a principal portion of the computer. The CPU 21 controls the sections in order to realize various functions of the self-checkout apparatus 100 on the basis of an operating system and application programs stored in the ROM 22.

The ROM 22 is equivalent to a main storage portion of the computer. The ROM 22 stores the operating system and the application programs. One of the application programs is a control program for control processing explained below. The ROM 22 sometimes stores data referred to by the CPU 21 in performing various kinds of processing.

The RAM 23 is equivalent to the main storage portion of the computer. The RAM 23 stores data referred to by the CPU 21 in performing the various kinds of processing. Further, the RAM 23 is used as a so-called work area in which data temporarily used by the CPU 21 in performing the various kinds of processing is stored.

The fixed scanner 24 picks up an image of a commodity held in front of the scanner window 11 and then identifies, with image processing, a barcode displayed on the commodity. The fixed scanner 24 outputs information represented by the identified barcode to the CPU 21. Note that, as the fixed scanner 24, well-known devices of other types that identify a barcode making use of reflection of a laser beam can also be used.

The printer 25 includes a receipt printer and a journal printer. The receipt printer prints various kinds of information on a receipt sheet to thereby issue various vouchers. The various vouchers are a receipt showing content and the like of commercial transaction, an untaken article slip explained below, and the like. The vouchers issued by the receipt printer are discharged from the receipt issue port 13 to the outside of the main body 1. The journal printer prints, on a journal sheet, journal data including information printed on the receipt sheet by the receipt printer. The journal sheet is retained on the inside of the main body 1 as long as the journal sheet is not taken out by a maintenance person.

The card reader writer 26 reads data recorded in a card inserted into the card insertion port 14 by the shopper. The card reader writer 26 writes data into the card. The card is a point card, an IC card for adjustment, or the like. The card reader writer 26 discharges the card subjected to necessary processing from the card insertion port 14 to the outside of the main body 1. The card insertion port 14 holds the card to be discharged in a state in which a part of the card is projected to the outside of the main body 1.

The human sensor 27 detects the presence of a person located to be opposed to the self-checkout apparatus 100. Therefore, the human sensor 27 is an example of a person detecting section. As the human sensor 27, well-known sensors of an infrared type and the like can be used.

The coin paying and receiving unit 28 stores coins taken into the inside of the main body 1 from the opening 15a of the coin input tray 15. The coin paying and receiving unit 28 includes a discharging unit 28a. The discharging unit 28a discharges coins serving as change to the change tray 16. Therefore, the discharging unit 28a is an example of a discharge mechanism.

The coin sensor 29 detects coins discharged to the reject tray 17. As the coin sensor 29, it is possible to use various well-known devices such as a device that detects a magnetic field change due to approach of a coin and a device that detects presence or absence of blocking of an optical path by a coin. The coin sensor 29 is an example of an article detecting section.

The bill paying and receiving unit 30 stores bills inserted from the bill insertion port 18. The bill paying and receiving unit 30 includes a discharging unit 30a. The discharging unit 30a discharges bills serving as change from the bill discharge port 19. Therefore, the discharging unit 30a is an example of the discharge mechanism.

The bill sensor 31 detects bills held by the bill discharge port 19. As the bill sensor 31, it is possible to use various well-known devices such as a device that detects a magnetic field change due to approach of a bill and a device that detects presence or absence of blocking of an optical path by a bill. The bill sensor 31 is an example of the article detecting section.

The operation of the self-checkout apparatus 100 configured as explained above is explained.

If the self-checkout apparatus 100 is in an operating state, the CPU 21 waits for various instructions to be given to the CPU 21. If operation for instructing implementation of accounting concerning a commercial transaction is performed, for example, on the touch panel 10, the CPU 21 starts, in response to the operation, control processing according to the control program stored in the ROM 22. Note that content of processing explained below is an example. Various kinds of processing capable of obtaining the same result can be used as appropriate.

Figure 4:
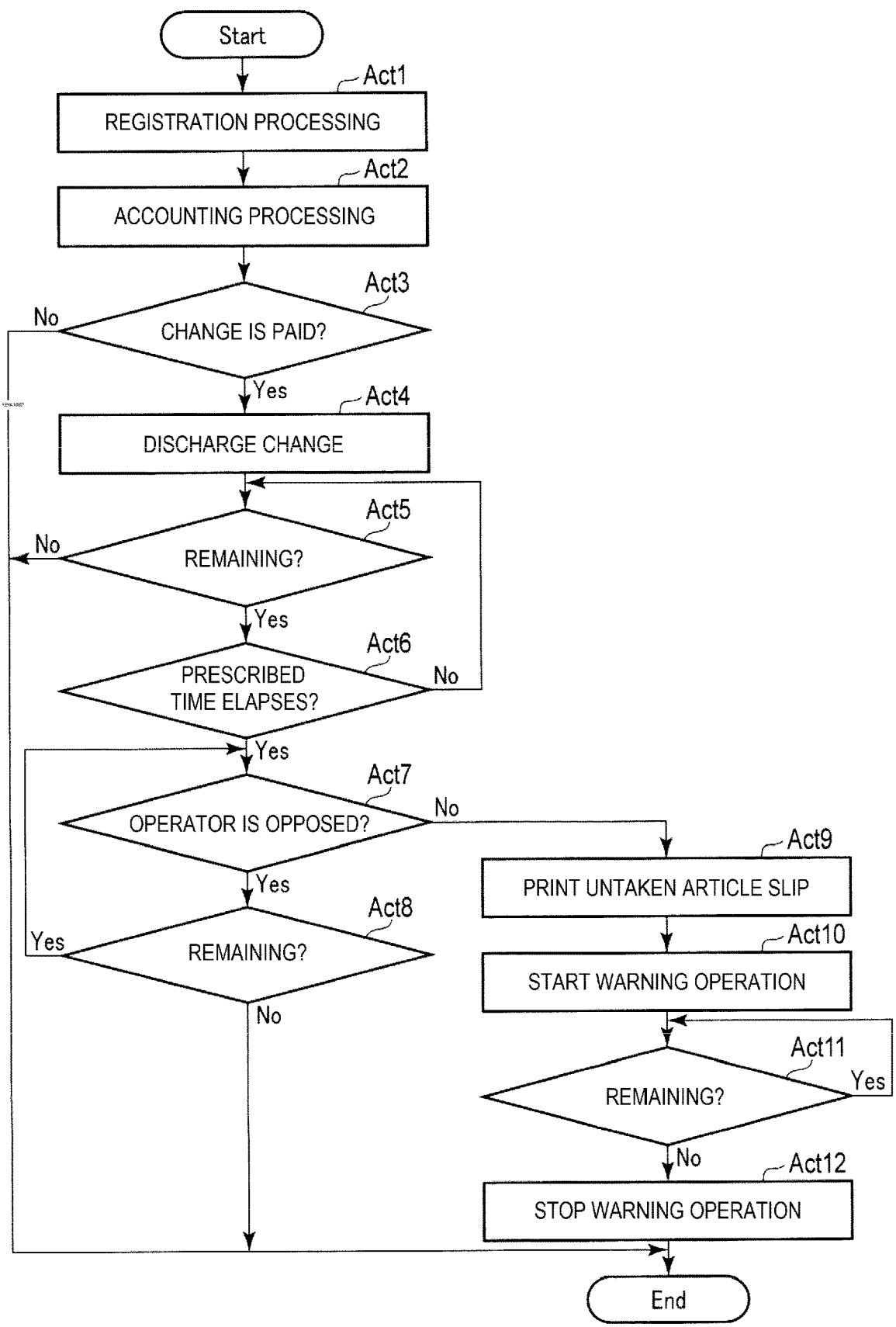
FIG. 4 is a flowchart of control processing by a CPU shown in FIG. 3.

FIG. 4 is a flowchart of the control processing by the CPU 21.

In Act 1, the CPU 21 performs registration processing for registering a purchased commodity. Specifically, the CPU 21 waits for registration operation by the operator to be performed. The registration operation is, for example, an operation for holding the purchased commodity in front of the scanner window 11, an operation for bringing the handy scanner 12 close to a barcode displayed on the purchased commodity, or an operation for touching the touch panel 10 in order to designate the purchased commodity.

If the purchased commodity is held in front of the scanner window 11, the fixed scanner 24 recognizes, with image processing, the barcode displayed on the purchased commodity and sends information represented by the barcode to the CPU 21. If the handy scanner 12 is brought close to the barcode, the handy scanner 12 identifies the barcode and sends the information represented by the barcode to the CPU 21. If an operation for touching the touch panel 10 is performed in order to designate the purchased commodity, the touch panel 10 sends position information concerning a touch position to the CPU 21.

The CPU 21 determines, as a commodity code of the purchased commodity, a commodity code included in the information sent from the fixed scanner 24 or the handy scanner 12 or a commodity code associated with the touch position sent from the touch panel 10. The CPU 21 updates information in a commodity list area set in the RAM 23 in order to add the commodity identified by the commodity code to a list of purchased commodities.

If registration of all purchased commodities is finished and operation for instructing implementation of accounting processing is performed, for example, on the touch panel 10, the CPU 21 ends the registration processing and proceeds to Act 2.

In Act 2, the CPU 21 performs the accounting processing. Specifically, the CPU 21 calculates a settlement amount that should be settled for purchase of all the registered purchased commodities. The CPU 21 settles the calculated settlement amount using a settlement method designated by the operator out of a plurality of settlement methods. As the settlement method, it is possible to appropriately use various settlement methods for using cash, a credit card, a debit card, a prepaid card, electronic money, points, notes, and the like. The CPU 21 executes the control processing based on the control program in this way, whereby the computer including the CPU 21 as the principal portion functions as a settling section.

In Act 3, the CPU 21 checks whether change is paid as a result of the settlement processing. If determining Yes because change is paid, the CPU 21 proceeds to Act 4.

In Act 4, the CPU 21 determines payment amounts for respective denominations on the basis of a change amount calculated in the accounting processing. The CPU 21 instructs the coin paying and receiving unit 28 to discharge the payment amount of coins and instructs the bill paying and receiving unit 30 to discharge the payment amount of bills. In response to the instruction, the coin paying and receiving unit 28 and the bill paying and receiving unit 30 respectively drive the discharging unit 28a and the discharging unit 30a to discharge the coins and the bills as the change. The discharged coins and bills are held by the change tray 16 and the bill discharge port 19. In this way, if the coin paying and receiving unit 28 discharges the coins, the coin sensor 29 detects the coins. If the bill paying and receiving unit 30 discharges the bills, the bill sensor 31 detects the bills. The CPU 21 executes the control processing based on the control program in this way, whereby the computer including the CPU 21 as the principal portion functions as a discharge control section. A function of a discharge section is realized by cooperation of the discharging unit 28a and the discharging unit 30a and the CPU 21.

In Act 5, the CPU 21 checks whether the change discharged as explained above remains in the change tray 16 or the bill discharge port 19. If the coin sensor 29 or the bill sensor 31 detects the coins or the bills, the CPU 21 determines Yes and proceeds to Act 6.

In Act 6, the CPU 21 checks whether a prescribed time elapses after the change is discharged. If determining No because the prescribed time does not elapse yet, the CPU 21 returns to Act 5. It is assumed that the prescribed time is, for example, 60 seconds. However, the prescribed time may be optional. The prescribed time may be set by, for example, a designer of the self-checkout apparatus 100 or an administrator of the self-checkout apparatus 100.

In this way, in Act 5 and Act 6, the CPU 21 waits for the prescribed time to elapse in a state in which the change remains. If determining Yes in Act 6 because the prescribed time elapses, the CPU 21 proceeds to Act 7.

In Act 7, the CPU 21 checks whether the operator is opposed to the self-checkout apparatus 100. If the human sensor 27 is in a detecting state, the CPU 21 determines Yes and proceeds to Act 8.

In Act 8, the CPU 21 checks whether the change remains in the change tray 16 or the bill discharge port 19. If the coin sensor 29 or the bill sensor 31 detects coins or bills, the CPU 21 determines Yes and returns to Act 7.

In this way, in Act 7 and Act 8, the CPU 21 waits for the operator to leave the front of the self-checkout apparatus 100 or all the change to be removed.

If the human sensor 27 is in an un-detecting state, the CPU 21 determines No in Act 7 and proceeds to Act 9. In this way, if the operator leaves the front of the self-checkout apparatus 100 while leaving the change behind before the prescribed time elapses after the change is discharged or after the prescribed time elapses after the change is discharged, the CPU 21 proceeds to Act 9.

In Act 9, the CPU 21 instructs the printer 25 to print an untaken article slip. Specifically, the CPU 21 generates an image shown on the untaken article slip and gives the image to the printer 25. The printer 25 prints the image given from the CPU 21 on a receipt sheet with the receipt printer and discharges the receipt sheet from the receipt issue port 13.

FIG. 5 is a diagram showing an example of an untaken article slip 40.

The untaken article slip 40 includes a region 41, a region 42, and a region 43.

The region 41 shows a sentence for informing a situation of untaken change. In the example shown in FIG. 5, the region 41 shows a sentence for informing that only coins of the change are left untaken. When proceeding to Act 9, if the coin sensor 29 detects coins and the bill sensor 31 does not detect bills, the CPU 21 displays the sentence shown in FIG. 5 in the region 41. When proceeding to Act 9, if the coin sensor 29 does not detect coins and the bill sensor 31 detects bills, the CPU 21 displays, in the region 41, a sentence such as "Concerning the transaction described below, bills of change are left untaken". When proceeding to Act 9, if the coin sensor 29 and the bill sensor 31 detect both of coins and bills, the CPU 21 displays, in the region 41, a sentence such as "Concerning the transaction described below, both of coins and bills of change are left untaken".

The region 42 shows content of a transaction in which change is left untaken. What kind of information in information representing the content of the transaction is displayed in the region 42 is optional. The information displayed in the region 42 may be decided by, for example, the designer of the self-checkout apparatus 100 or the administrator of the self-checkout apparatus 100. In the example shown in FIG. 5, information for specifying the transaction in which change is left untaken such as a transaction number, a register number, a transaction date and time, and a list of purchased commodities is displayed in the region 42.

The region 43 shows a result of accounting. What kind of information in information representing the result of the accounting is displayed in the region 43 is optional. The information displayed in the region 43 may be decided by, for example, the designer of the self-checkout apparatus 100 or the administrator of the self-checkout apparatus 100. In the example shown in FIG. 5, a settlement amount, a consumption tax amount, a deposit amount, a change amount, and respective amounts of bills and coins of change are displayed in the region 43.

As explained above, the untaken article slip 40 is a voucher for making it possible to confirm afterwards that change, which is an example of an article, remains even if a prescribed time elapses after discharge. The CPU 21 executes the control processing based on the control program in this way, whereby the computer including the CPU 21 as the principal portion functions as a processing section.

In Act 10, the CPU 21 starts a warning operation. The warning operation is an operation for informing the store clerk that change is left untaken. The warning operation is, for example, flashing of the patrol lamp 20. The warning operation may be an output of warning sound or notification to other terminals. The warning operation may include a plurality of operations. In this way, the patrol lamp 20 is an example of an operating section that performs an alarming operation.

In Act 11, the CPU 21 checks whether change remains in the change tray 16 or the bill discharge port 19. If the coin sensor 29 or the bill sensor 31 detects coins or bills, the CPU 21 determines Yes and repeats Act 11. In this way, in Act 11, the CPU 21 waits for the untaken change to be removed.

For example, if the store clerk in charge of monitoring of the self-checkout apparatus 100 recognizes, for example, according to the warning operation that the change is left untaken, the store clerk removes the untaken change and stores the change together with the untaken article slip.

If the change is removed in this way, both of the coin sensor 29 and the bill sensor 31 do not detect coins and bills. Consequently, the CPU 21 determines No in act 11 and proceeds to Act 12.

In Act 12, the CPU 21 stops the warning operation started in Act 10. Consequently, the CPU 21 ends the control processing shown in FIG. 4.

Note that the CPU 21 omits other kinds of processing and ends the processing shown in FIG. 4 in any one of cases (1) to (3) described below. (1) The CPU 21 determines No in Act 3 because change is not paid as a result of the accounting processing in Act 2. (2) In the waiting state in Act 5 and Act 6, the CPU 21 determines No in Act 5 because both of the coin sensor 29 and the bill sensor 31 do not detect coins and bills before the prescribed time elapses. (3) In the waiting state in Act 7 and Act 8, the CPU 21 determines No in Act 8 because both of the coin sensor 29 and the bill sensor 31 do not detect coins and bills before the human sensor 27 changes to the un-detecting state.

As explained above, if the change is not removed from the change tray 16 or the bill discharge port 19 for the prescribed time, the self-checkout apparatus 100 issues the untaken article slip. Therefore, the store clerk in charge of the monitoring of the self-checkout apparatus 100 can confirm afterwards, by storing the untaken change together with the untaken article slip, in which transaction the untaken change is left untaken. Therefore, the store clerk does not need to write a memorandum. It is possible to reduce labor of management of the untaken change.

The self-checkout apparatus 100 shows, on the untaken article slip, the content of the transaction in which the change is left untaken. Therefore, the store clerk can check, by, for example, collating content of a transaction described on a receipt carried by the shopper or content of a transaction claimed by a shopper, genuineness of the shopper who claims the untaken change later.

The self-checkout apparatus 100 performs the warning operation according to the issuance of the untaken article slip. Therefore, the store clerk can quickly remove the untaken change and the untaken article slip from the self-checkout apparatus 100 and manage both of the untaken change and the untaken article slip.

Even if the change is not removed from the change tray 16 or the bill discharge port 19 for the prescribed time, the self-checkout apparatus 100 does not issue the untaken article slip while the operator is detected by the human sensor 27. The self-checkout apparatus 100 issues the untaken article slip if the operator is not detected by the human sensor 27. Therefore, the untaken article slip is not issued by mistake if taking-out of change is delayed because, for example, a shopper is slow in taking out the change but the shopper does not seem to forget to take the change.

The self-checkout apparatus 100 creates the untaken article slip by printing the necessary information on the receipt sheet with the receipt printer included in the printer 25. Therefore, information shown on the untaken article slip is also printed on the journal sheet by the journal printer and stored. Therefore, for example, even if the untaken article slip is lost, it is possible to check afterwards concerning which transaction the change is left untaken.

Second Embodiment

A second embodiment is explained below with reference to the drawings. Note that, in the second embodiment, a self-checkout system including a self-checkout apparatus including a function of a settlement apparatus and an attendant apparatus including a function of a management apparatus is explained as an example.

Figure 6:
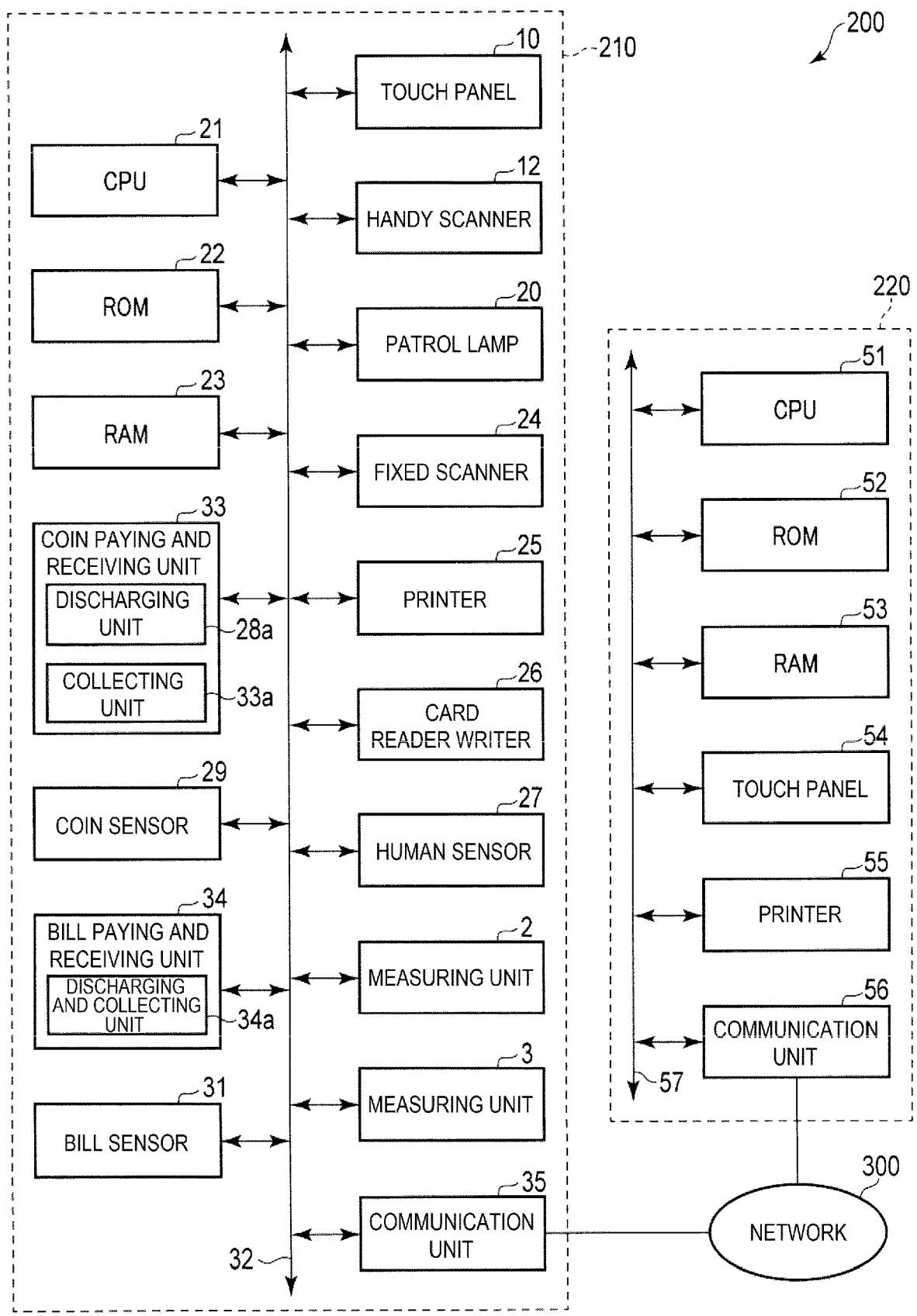
FIG. 6 is a block diagram showing a main part circuit configuration of a self-checkout system according to a second embodiment.

FIG. 6 is a block diagram showing a main part circuit configuration of a self-checkout system 200. Note that, in FIG. 6, parts same as the parts shown in FIGS. 1 to 3 are denoted by the same reference numerals and signs. Detailed explanation of the parts is omitted.

As shown in FIG. 6, the self-checkout system 200 includes a self-checkout apparatus 210 and an attendant apparatus 220. The self-checkout apparatus 210 and the attendant apparatus 220 are capable of communicating via a network 300. The network 300 may be any network if the network enables information communication between the self-checkout apparatus 210 and the attendant apparatus 220. However, typically, the network 300 is a LAN (local area network).

The self-checkout apparatus 210 is operated by a shopper to perform various kinds of processing for checkout in a store. The attendant apparatus 220 is operated by a store clerk in the store to perform various kinds of processing for, for example, support of the operation of the self-checkout apparatus 210 by the shopper and monitoring of an operation state of the self-checkout apparatus 210.

The self-checkout apparatus 210 includes the measuring units 2 and 3, the touch panel 10, the handy scanner 12, the patrol lamp 20, the CPU 21, the ROM 22, the RAM 23, the fixed scanner 24, the printer 25, the card reader writer 26, the human sensor 27, the coin sensor 29, the bill sensor 31, a coin paying and receiving unit 33, a bill paying and receiving unit 34, and a communication unit 35. The measuring units 2 and 3, the touch panel 10, the handy scanner 12, the CPU 21, the ROM 22, the RAM 23, the fixed scanner 24, the printer 25, the card reader writer 26, the coin sensor 29, the coin paying and receiving unit 33, the bill paying and receiving unit 34, and the communication unit 35 are connected via the communication system 32.

That is, the self-checkout apparatus 210 includes a configuration in which the coin paying and receiving unit 33 and the bill paying and receiving unit 34 are provided instead of the coin paying and receiving unit 28 and the bill paying and receiving unit 30 in the self-checkout apparatus 100 in the first embodiment and the communication unit 35 is added.

The coin paying and receiving unit 33 is obtained by additionally providing a collecting unit 33a in the coin paying and receiving unit 28. The collecting unit 33a includes a moving mechanism that moves a movable member forming a bottom portion of the change tray 16 and a coin collection box that receives coins dropping from the change tray 16 if the movable member is in an open state.

The bill paying and receiving unit 34 includes a discharging and collecting unit 34a instead of the discharging unit 30a in the bill paying and receiving unit 30. The discharging and collecting unit 34a discharges bills serving as change from the bill discharge port 19. The discharging and collecting unit 34a includes a bill collection box, draws in bills held by the bill discharge port 19, collects the bills in the bill collection box. Note that one collection box may be used as both of the coin collection box and the bill collection box.

The communication unit 35 performs data communication via the network 300. If the network 300 is a LAN, a well-known communication device adapted to the LAN can be used as the communication unit 35.

The attendant apparatus 220 includes a CPU 51, a ROM 52, a RAM 53, a touch panel 54, a printer 55, and a communication unit 56. The CPU 51, the ROM 52, the RAM 53, the touch panel 54, the printer 55, and the communication unit 56 are connected via a communication system 57 including a system bus.

The CPU 51, the ROM 52, and the RAM 53 are connected by the communication system 57 to configure a computer for controlling the attendant apparatus 220.

The CPU 51 is equivalent to a principal portion of the computer. The CPU 51 controls the sections in order to realize various functions of the attendant apparatus 220 on the basis of an operating system and application programs stored in the ROM 52.

The ROM 52 is equivalent to a main storage portion of the computer. The ROM 52 stores the operating system and the application programs. One of the application programs is a control program for control processing explained below. Note that the control program is different from the control program in the first embodiment. The ROM 52 sometimes stores data referred to by the CPU 51 in performing various kinds of processing.

The RAM 53 is equivalent to the main storage portion of the computer. The RAM 53 stores data referred to by the CPU 51 in performing the various kinds of processing. Further, the RAM 53 is used as a so-called work area in which data temporarily used by the CPU 51 in performing the various kinds of processing is stored.

The touch panel 54 displays various screens for informing the store clerk of various kinds of information. A part of the various screens configures a GUI. The touch panel 54 receives touch operation for operation of the GUI.

The printer 55 issues various vouchers by printing various kinds of information on a print sheet.

The communication unit 56 performs data communication via the network 300. As the communication unit 56, if the network 300 is a LAN, a well-known communication device adapted to the LAN can be used.

The operation of the self-checkout system 200 configured as explained above is explained.

If the self-checkout apparatus 210 is in an operating state, the CPU 21 waits for various instructions to be given to the CPU 21. If operation for instructing implementation of accounting concerning a commercial transaction is performed, for example, on the touch panel 10, the CPU 21 starts, in response to the operation, control processing according to the control program stored in the ROM 22. Note that content of processing explained below is an example. Various kinds of processing capable of obtaining the same result can be used as appropriate.

Figure 7:
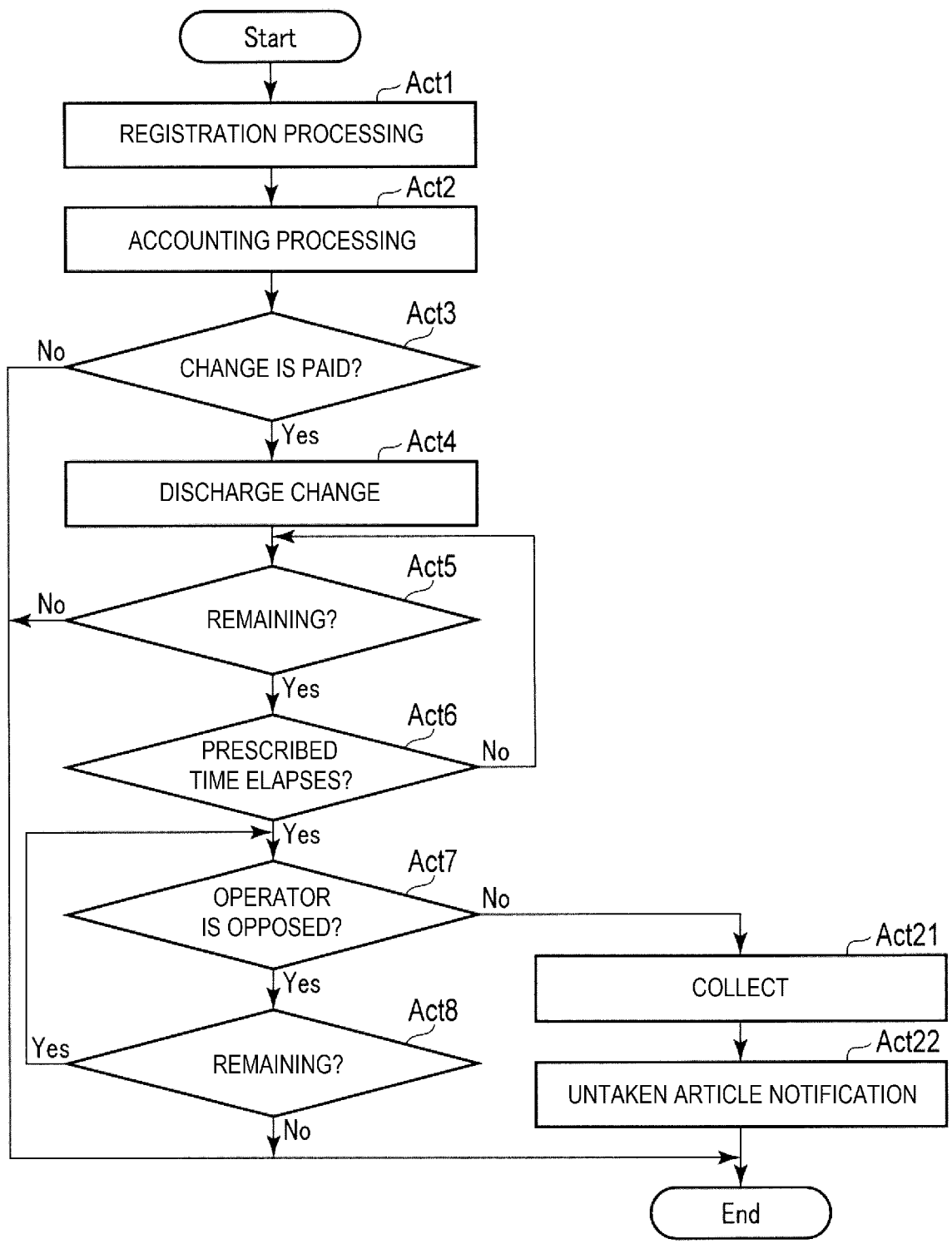
FIG. 7 is a flowchart of control processing by a CPU included in a settlement apparatus shown in FIG. 6.

FIG. 7 is a flowchart of the control processing by the CPU 21. Note that acts same as the acts shown in FIG. 4 are denoted by the same reference signs. Detailed explanation of the acts is omitted.

In Act 1 to Act 8, the CPU 21 executes the processing in the same manner as in the first embodiment.

If the CPU 21 is in the waiting state in Act 7 and Act 8, the CPU 21 determines No in Act 7 and proceeds to Act 21 if the human sensor 27 changes to the un-detecting state. In this way, if the operator leaves the front of the self-checkout apparatus 210 while leaving the change behind before the prescribed time elapses after the change is discharged or after the prescribed time elapses after the change is discharged, the CPU 21 proceeds to Act 21.

In Act 21, the CPU 21 collects the remaining change. Specifically, if the coin sensor 29 detects coins, the CPU 21 drives the collecting unit 33a to collect the coins remaining in the change tray 16. If the bill sensor 31 detects bills, the CPU 21 drives the discharging and collecting unit 34a to collect the bills held by the bill discharge port 19.

In Act 22, the CPU 21 performs untaken article notification to the attendant apparatus 220. The untaken article notification is notification for causing the attendant apparatus 220 to issue an untaken article slip. Specifically, the CPU 21 controls the communication unit 35 to transmit notification information of a predetermined form for the untaken article notification to the network 300 while addressing the notification information to the attendant apparatus 220. The CPU 21 includes, in the notification information, information that should be shown on the untaken article slip or image data indicating an image representing the untaken article slip. Consequently, the CPU 21 ends the control processing shown in FIG. 7. The CPU 21 executes the control processing based on the control program in this way, whereby a function of a notifying section is realized by cooperation of the computer including the CPU 21 as the principal portion and the communication unit 35.

On the other hand, if the attendant apparatus 220 is in a normal operation state, the CPU 51 executes, according to the control program stored in the ROM 52, control processing for coping with notification from the self-checkout apparatus 210.

Figure 8:
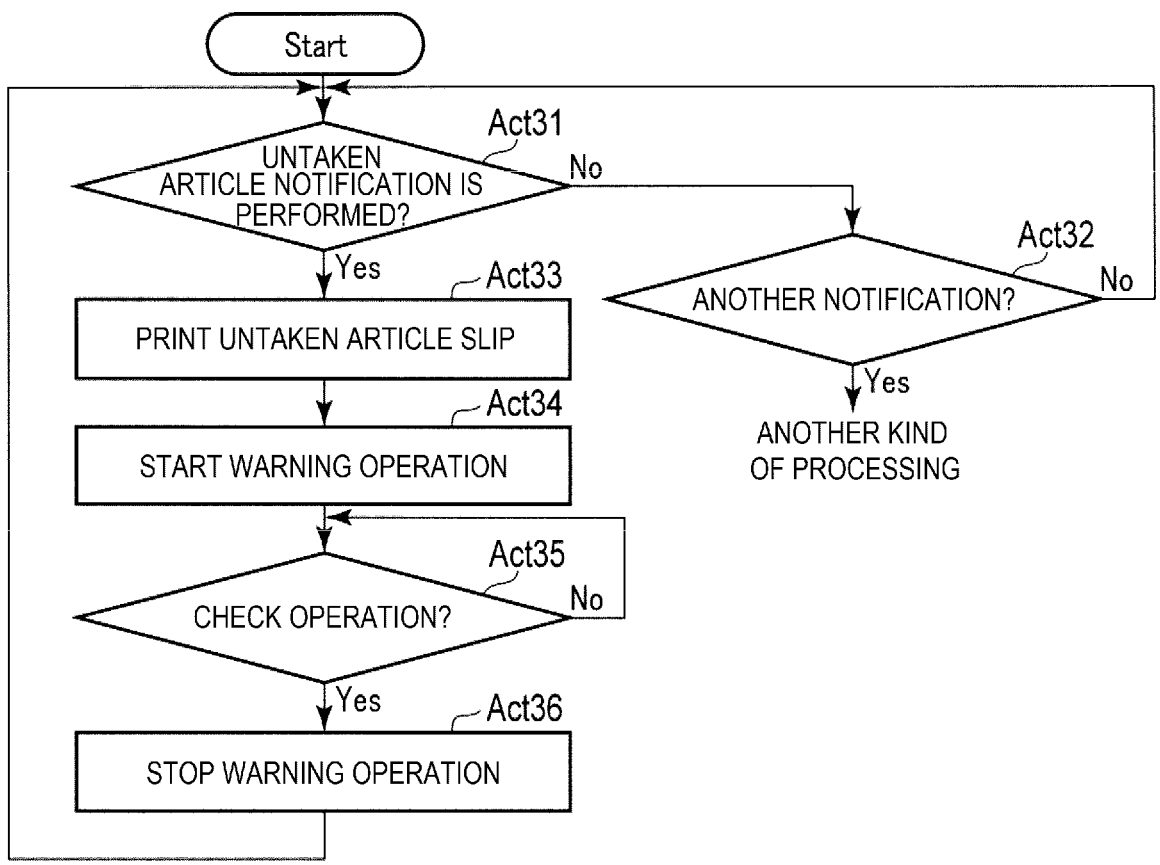
FIG. 8 is a flowchart of control processing by a CPU included in an attendant apparatus shown in FIG. 6.

FIG. 8 is a flowchart of the control processing by the CPU 51.

In Act 31, the CPU 51 checks whether the untaken article notification is performed. If the untaken article notification is not performed, the CPU 51 determines No and proceeds to Act 32.

In Act 32, the CPU 51 checks whether another notification different from the untaken article notification is performed. If the relevant notification is not performed, the CPU 51 determines No and returns to Act 31.

In this way, in Act 31 and Act 32, the CPU 51 waits for the untaken article notification or another notification to be performed. If determining Yes in Act 32 because another notification different from the untaken article notification is received by the communication unit 56, the CPU 51 shifts to processing corresponding to the notification. Explanation of the processing performed at this point is omitted.

If the notification information is transmitted to the attendant apparatus 220 via the network 300, in the attendant apparatus 220, the communication unit 56 receives the notification information. If the untaken article notification is performed in this way, the CPU 51 determines Yes in Act 31 and proceeds to Act 33.

In Act 33, the CPU 51 instructs the printer 55 to print the untaken article slip. Specifically, if information that should be shown on the untaken article slip is included in the notification information for the untaken article notification, the CPU 51 generates an image representing these kinds of information and gives the image to the printer 55. If image data is included in the notification information for the untaken article notification, the CPU 51 gives an image indicated by the image data to the printer 55. The printer 55 prints the image given from the CPU 51 on a sheet and discharges the sheet. Consequently, the untaken article slip is issued in the attendant apparatus 220. The CPU 51 executes the control processing based on the control program in this way, whereby the computer including the CPU 51 as the principal portion functions as a processing section.

In Act 34, the CPU 51 starts a warning operation. The warning operation is an operation for informing the store clerk that the untaken article slip is issued. The warning operation is, for example, display of a message on the touch panel 54. Alternatively, the warning operation is an output of buzzer sound, chime sound, or the like by a not-shown sound emitting device. The warning operation may be any other operation or may include a plurality of operations.

In Act 35, the CPU 51 checks whether operation for checking issuance of the untaken article slip is performed. If the relevant operation is not performed, the CPU 51 determines No and repeats Act 35. In this way, in Act 35, the CPU 51 waits for the check operation to be performed.

For example, if a store clerk who monitors the self-checkout apparatus 210 using the attendant apparatus 220 recognizes that, for example, the untaken article slip is issued according to the warning operation, the store clerk stores the untaken article slip. Then, the store clerk performs check operation.

If the check operation is performed in this way, the CPU 51 determines Yes in Act 35 and proceeds to Act 36.

In Act 36, the CPU 51 stops the warning operation started in Act 34. Consequently the CPU 51 returns to the waiting state in Act 31 and Act 32.

In this way, with the self-checkout system 200, the store clerk who monitors the self-checkout apparatus 210 using the attendant apparatus 220 can recognize that change is left untaken in the attendant apparatus 220 without moving to the self-checkout apparatus 210. Consequently, the store clerk can easily and quickly recognize that the change is left untaken.

With the self-checkout system 200, the untaken change is automatically collected by the collecting unit 33a and the discharging and collecting unit 34a. Therefore, the store clerk does not need to move to the self-checkout apparatus 210 and can manage the untaken change only by storing the untaken article slip.

Various modified implementations described below of the embodiments are possible.

In the embodiments, by applying this application to a self-checkout apparatus including a function of managing, in time series, images obtained by picking up images of states of the operator with a camera, it is possible to easily specify, on the basis of information shown on the untaken article slip, an image in which a shopper who forgets to take change appears.

In the embodiments, as the processing for making it possible to check the untaken article afterwards, for example, processing described below may be applied instead of the printing of the untaken article slip.

(1) Information same as the information shown on the untaken article slip is printed only on a journal sheet.

(2) The information shown on the untaken article slip is stored in a storage medium without being printed on any sheet. In this case, the storage medium may be a storage medium provided in the self-checkout apparatus or may be a storage medium provided in an external server or the like.

(3) In the case of a self-checkout apparatus adapted to a well-known electronic receipt service, the untaken article may be notified to, via an electronic receipt server, an information terminal registered in advance owned by a shopper.

In the embodiments, this application can also be applied to a settlement apparatus of another form such as a settlement apparatus in a semi-self-type checkout system.

In the embodiments, the article is not limited to money serving as change and may be various cards such as a credit card and an electronic money card.

In the embodiments, transfer of the self-checkout apparatus 100 or 210 or the attendant apparatus 220 to a user is performed in a state in which the control program is stored in the ROM 22 or 52. However, the self-checkout apparatus 100 or 210 or the attendant apparatus 220 may be transferred to the user in a state in which the control program is not stored in the ROM 22 or 52 and the control program may be transferred to the user while being recorded in a removable recording medium or via a network. In this case, for example, according to operation by the user, the control program is written in the RAM 23 or 53 or a separately provided auxiliary storage unit such as a HDD (hard disk drive). As the removable recording medium, it is possible to use a magnetic disk, a magneto-optical disk, an optical disk, a semiconductor memory, or the like.

In the first embodiment, the coin paying and receiving unit 33 may be provided instead of the coin paying and receiving unit 28. The bill paying and receiving unit 34 may be provided instead of the bill paying and receiving unit 30.

In the second embodiment, the coin paying and receiving unit 28 may be provided instead of the coin paying and receiving unit 33. The bill paying and receiving unit 30 may be provided instead of the bill paying and receiving unit 34. In this case, it is desirable that the self-checkout apparatus 210 notifies the attendant apparatus 220 of the removal of the change and, instead of Act 35, it is determined whether the notification is performed.

In the second embodiment, the processing for making it possible to check the untaken article afterwards can also be carried out in an apparatus other than the attendant apparatus 220 such as a registration apparatus in a semi-self-type checkout system, an information terminal set in a service counter, or an information terminal carried by the store clerk.

The several embodiments are explained above. However, the embodiments are presented as examples and are not intended to limit the scope of the invention. These new embodiments can be implemented in other various forms. Various omissions, substitutions, and changes can be performed without departing from the spirit of the invention. These embodiments and modifications of the embodiments are included in the scope and the gist of the invention and included in the inventions described in claims and the scope of equivalents of the inventions.

The invention described in the claims of this application as originally filed is described below.

(Supplementary Item 1) A settlement apparatus including:
a settling section configured to perform settlement processing for settlement concerning a commercial transaction;
a discharging section configured to discharge a prescribed article to a receiving section after the settlement processing by the settling section is completed;
an article detecting section configured to detect remaining of the article in the receiving section; and
a processing section configured to, if the article detecting section detects the remaining of the article at a point in time when a prescribed time elapses after the article is discharged by the discharging section, perform a predetermined processing for enabling confirmation of the detection afterwards.

(Supplementary Item 2) The apparatus according to Supplementary Item 1, wherein the processing section print a voucher for verifying that the article remained in the receiving section is an untaken article.

(Supplementary Item 3) The apparatus according to Supplementary Item 1,
further including a person detecting section configured to detect presence of a person located to be opposed to the settlement apparatus,
wherein the processing section does not perform the predetermined processing while the presence of the person is detected by the person detecting section even if the prescribed time elapses.

(Supplemental Item 4) A control program causing a computer that controls a settlement apparatus including a discharging mechanism configured to discharge a prescribed article to a receiving section, and an article detecting section configured to detect remaining of the article in the receiving section to function as:
a settling section configured to perform settlement processing for settlement concerning a commercial transaction;
a discharge control section configured to control the discharging mechanism to discharge the prescribed article to the receiving section after the settlement processing by the settling section is completed; and
a processing section configured to, if the article detecting section detects the remaining of the article at a point in time when a prescribed time elapses after the article is discharged by the discharge control section, perform a predetermined processing for enabling confirmation of the detection afterward.

(Supplementary Item 5) A checkout system including a settlement apparatus and a management apparatus, wherein
the settlement apparatus includes:
a settling section configured to perform settlement processing for settlement concerning a commercial transaction;
a discharging section configured to discharge a prescribed article to a receiving section after the settlement processing by the settling section is completed;
an article detecting section configured to detect remaining of the article in the receiving section; and
a notifying section configured to notify, if the article detecting section detects the remaining of the article at a point in time when a prescribed time elapses after the article is discharged by the discharging section, the management apparatus to that effect, and
the management apparatus includes a processing section configured to perform, in response to reception of the notification by the notifying section, a predetermined processing for enabling confirmation afterward that the article is untaken.

What is claimed is:

1. A checkout system comprising a settlement apparatus and a management apparatus, wherein
the settlement apparatus comprises:
a first processor that executes first instructions that facilitate performance of first operations, comprising:
performing settlement processing for settlement of a commercial transaction;
based on the settlement processing, discharging a prescribed article to a receiving section;
detecting, based on a blockage of an optical path or a change in magnetic field, a remaining of the prescribed article in the receiving section; and
based on detecting the remaining of the prescribed article in the receiving section and after an elapse of a prescribed time after discharging the prescribed article, notifying, via a notification, the management apparatus that the prescribed article has been detected in the receiving section, and
the management apparatus comprises:
a second processor that executes second instructions that facilitate performance of second operations, comprising:
recording, in response to receiving the notification, information indicating the prescribed article in association with identification information for identifying the commercial transaction.

2. The checkout system according to claim 1, the first operations further comprise detecting a presence of a person located opposite to the settlement apparatus, wherein
the second operations of the recording is not performed while the presence of the person is detected and at the elapse of the prescribed time.

3. The checkout system according to claim 1, wherein the second operations further comprise controlling a printer to print the identification information and the information indicating the prescribed article on a sheet.

4. The checkout system according to claim 1, wherein the second operations further comprise causing a storage medium to store the identification information and the information indicating the prescribed article in association with each other.

5. The checkout system according to claim 1, wherein the prescribed article is change.

6. The checkout system according to claim 5, wherein the information indicating the prescribed article is information indicating which of a coin or a bill of the change remains.

7. The checkout system according to claim 1, wherein the second operations further comprise operating a patrol lamp after a paper has been printed.

8. The checkout system according to claim 1, wherein the checkout system is a semi-self-type checkout system.

9. The checkout system according to claim 1, wherein the checkout system is a self checkout system.

* * * * *